United States Patent [19]

Conboy

[11] Patent Number: 4,676,183

[45] Date of Patent: Jun. 30, 1987

[54] RING PARAVANE

[75] Inventor: Michael R. Conboy, Houston, Tex.

[73] Assignee: Western Geophysical Company of America, Houston, Tex.

[21] Appl. No.: 852,713

[22] Filed: Apr. 16, 1986

[51] Int. Cl.[4] .................. B63B 21/66; B63G 8/42
[52] U.S. Cl. ................................ 114/245; 114/244; 114/280; 114/332
[58] Field of Search ............... 114/242, 244, 245, 253, 114/274, 280, 332; 244/1 TD, 153 R, 34 A; 73/184, 185, 170 A

[56] References Cited

U.S. PATENT DOCUMENTS

| | | | |
|---|---|---|---|
| 1,395,924 | 11/1921 | Magoun | 114/244 |
| 1,410,872 | 3/1922 | Baldwin | 114/274 |
| 2,325,616 | 8/1943 | Landweber | 114/244 |
| 2,709,981 | 6/1955 | Wilcoxon . | |
| 2,879,737 | 3/1959 | Gorton . | |
| 2,981,220 | 4/1961 | Fehlner . | |
| 3,372,666 | 3/1968 | Baker | 114/245 |
| 3,404,565 | 10/1968 | Barry et al. . | |
| 3,507,068 | 4/1970 | Roberts . | |
| 3,560,912 | 2/1971 | Spink et al. . | |
| 3,605,675 | 9/1971 | Weese . | |
| 3,618,555 | 11/1971 | Kelly et al. | 114/244 |
| 3,774,570 | 11/1973 | Pearson . | |
| 3,842,770 | 10/1974 | Hedbawny et al. . | |
| 3,921,562 | 11/1975 | Kelly . | |
| 3,953,905 | 5/1976 | Paitson . | |
| 4,051,799 | 10/1977 | Wallen et al. . | |
| 4,055,138 | 10/1977 | Klein | 114/244 |
| 4,087,780 | 5/1978 | Itria et al. . | |
| 4,184,209 | 1/1980 | Crist . | |
| 4,252,074 | 2/1981 | Blaisdell . | |
| 4,463,701 | 8/1984 | Picket et al. . | |

FOREIGN PATENT DOCUMENTS

| | | | |
|---|---|---|---|
| 1435960 | 3/1966 | France | 244/1 TD |
| 528226 | 10/1940 | United Kingdom | 73/185 |
| 856153 | 12/1960 | United Kingdom | 244/1 TD |

OTHER PUBLICATIONS

Klein Associates Advertisement for K-wing Depressor.

Primary Examiner—Joseph F. Peters, Jr.
Assistant Examiner—Thomas J. Brahan
Attorney, Agent, or Firm—Barry C. Kane

[57] ABSTRACT

A submersible positioning device, such as a paravane coupled to a distant end of a towing cable may include a front cylindrical stabilizer having a wing diametrically disposed therein and having a predetermined angle of attack coupled to a towing bridle which in turn is coupled to the towing cable. A rear stabilizer may be coupled to the front stabilizer by a shaft, extending from the lower surface of the wing, and a plurality of struts coupled to the perimeter of the front stabilizer. A buoy coupled to the uppermost point of the front stabilizer may be pulled underwater while under tow, but returns the paravane to the surface for recovery purposes while not under a tow.

8 Claims, 4 Drawing Figures

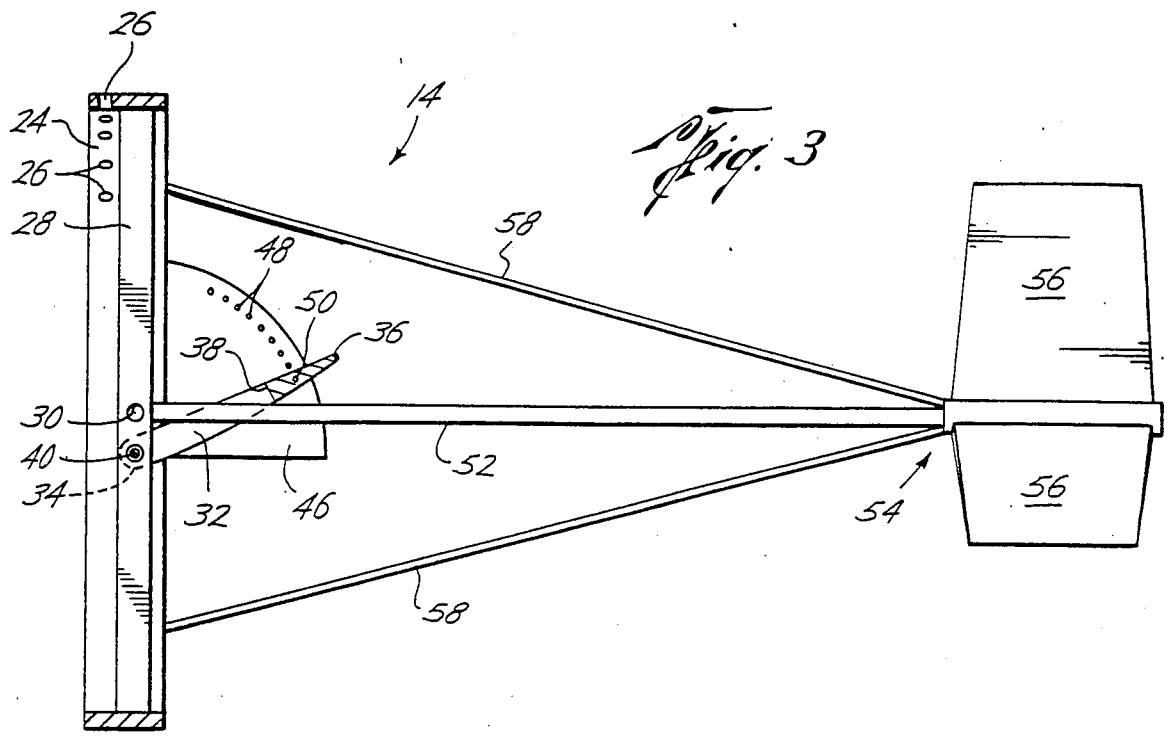
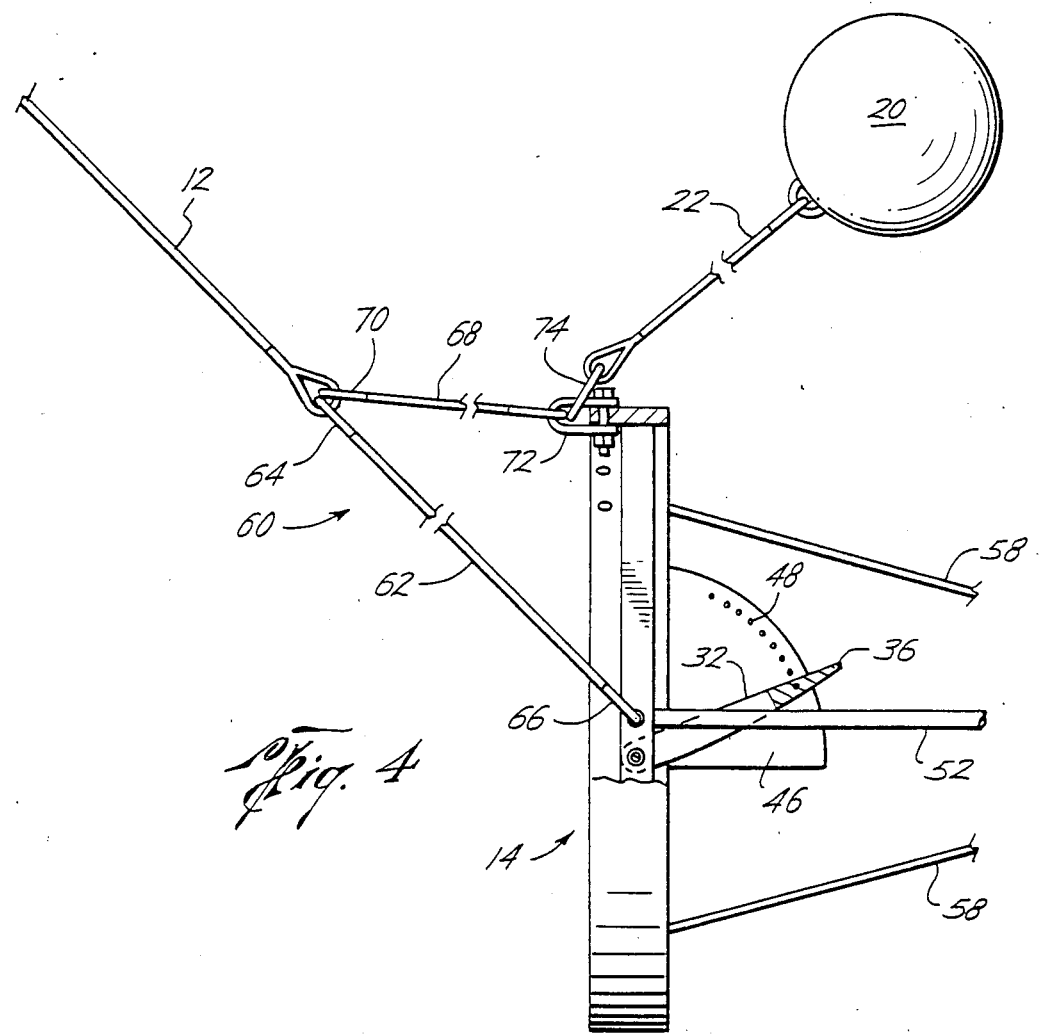

RING PARAVANE

FIELD OF THE INVENTION

This invention relates to marine exploration and particularly to an apparatus for positioning a submersible relative to a towing vehicle.

BACKGROUND OF THE INVENTION

Paravanes (also called cable depressors and water kites) have a variety of aquatic uses ranging from commercial fishing to national defense. Paravanes are most always used to position a towed object relative to a towing vehicle.

Early paravane designs consist of a square or rectangular framework including two or more upright supports and one or more horizontal vanes or wings interconnected therebetween. The tow point on the paravane is usually forward and above the center of gravity so that it will tow in the proper attitude. The towing depth of the paravane is controlled by a buoy connected to the paravane by a preselected length of cable. The rectangular paravanes have a tendency to become unstable at different towing velocities. Unstable paravanes wander behind the towing vehicle, spiral, and display reduced negative lift.

Conventional paravanes are more sophisticated, normally consisting of a cylindrical fuselage having one or more rotatable dive planes. The dive planes are connected to an internal depth control mechanism within the fuselage. Such depth control mechanisms include pressure detectors and distance measuring devices. Paravanes equipped with depth control mechanisms tend to oscillate or "hunt" about the desired depth before tracking properly. Conventional paravanes are more expensive than fixed-control paravanes because of the electronic packages. Because of the greater number of moving parts and the enclosed depth control mechanisms, conventional paravanes also require more maintenance, such as battery replacement or recharging, and depth control calibration.

SUMMARY OF THE INVENTION

It is an object of this invention to provide a hydrodynamically stable paravane offering increased structural stability and a high lift-to-weight ratio at a substantially low cost.

The present invention embodies a towed submersible positioning device consisting of a paravane having a cylindrical forward stabilizer connected to a towing cable. At least one foil or wing is mounted within the forward stabilizer at an adjustable angle of attack. Extending the length of the paravane is a shaft parallel to the longitudinal axis of the cylindrical stabilizer. A rear stabilizer is mounted to the opposite end of the shaft. The shaft and rear stabilizer are braced by a plurality of struts interconnecting the front and rear stabilizers. The tow depth and lateral offset of the paravane from the towing vehicle are controlled by the length of cable payed out and the axial orientation of the wing. A buoy coupled to the uppermost point of the front stabilizer returns the paravane to the surface if it becomes detached from the towing cable or is idle in the water. A tow fish may be coupled beneath the paravane by way of a metal chain.

BRIEF DESCRIPTION OF THE DRAWINGS

A better understanding of the benefits and advantages of my invention may be obtained from the appended detailed description and the drawings, wherein:

FIGS. 2 and 3 are front and side elevational views respectively of this invention; and FIG. 4 shows the coupling of the towing bridle and the recovery buoy of the invention.

DETAILED DESCRIPTION OF THE PREFERRED EMBODIMENT

Figure 1:
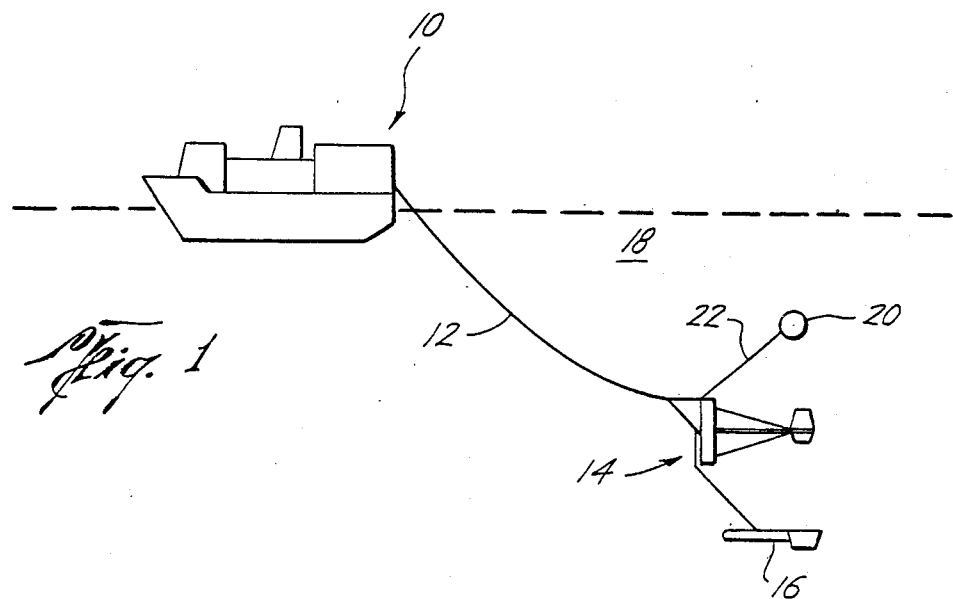
FIG. 1 generally illustrates the instant invention towed behind a ship.

In reference to the Figures, like reference characters indicate like components wherein FIG. 1 generally shows a ship 10 having a cable 12 towing a paravane 14 and a submersible 16 through a body of water 18. Paravane 14 is connected to a buoy 20 by a second length of a cable 22.

Figure 2:
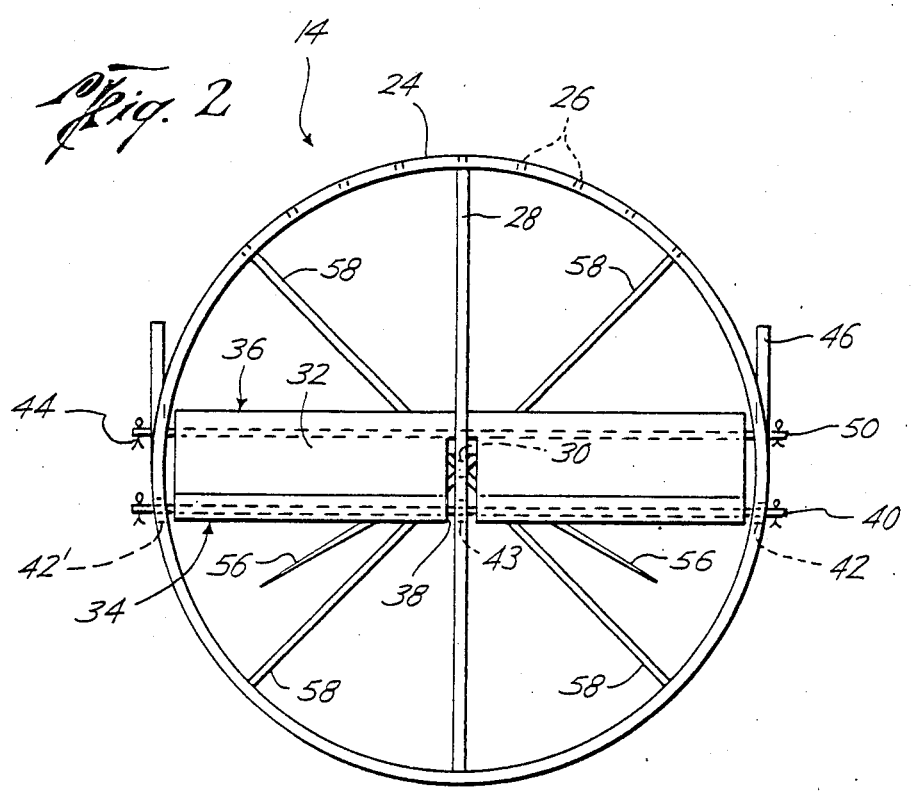

FIGS. 2 and 3 are front and side elevational views respectively of the paravane 14. In a preferred embodiment of this invention, paravane 14 has a front cylindrical stabilizer 24 having a plurality of holes 26 radially extending therethrough at regular intervals along one half of the cylinder. The front stabilizer 24 may be made of stainless steel or other suitable high-strength material such as aluminum, certain plastics, and fiberglass. Coupled across the diameter of the front stabilizer 24 is a span 28 of similar material having a hole 30 therein midway along its length. One end of the span 28 is joined to the front stabilizer 24 at a point essentially equal to the midpoint of the plurality of holes 26 extending through the front stabilizer, thus a substantially equal number of holes 26 fall on each side of the span 28. For future reference, the junction of the span 28 to the front stabilizer 24 midway along the holes 26, will be termed the top of the paravane 14.

Disposed within the front stabilizer 24 at a right angle to span 28 is a wing 32 having a leading edge and trailing edge portions 34 and 36, respectively. Midway along the leading edge 34 is a notch 38 for receiving the span 28. Extending through wing 32 near and parallel to the leading edge 34 is a first rod 40. The rod 40 extending through the leading edge 34, passes through holes such as 42 and 42' in the forward stabilizer 24 and a hole 43 in the span 28. Rod 40 may be retained within the front stabilizer 24 and wing 32 by cotter pins 44 passing through each end. At each end of the wing 32 and coupled to the rear portion of the front stabilizer 24 are adjustment brackets 46 having a plurality of holes indicated as 48. A second rod 50 extending through wing 32, near and parallel to the trailing edge 36 is retained within a predetermined one of the plurality of holes 48 in each adjustment bracket 46 to adjustably fix the angle of attack of wing 32.

The angle of attack of a wing or foil is defined as the angle from the horizontal of an inclined plane passing through the leading edge and the trailing edge. The angle of attack is typically given in degrees from the horizontal to the leading edge. For example, but not by way of limitation, the adjustment brackets 44 may give an angle of attack ranging from −5° to −40°.

Coupled at the midpoint of span 28 and extending perpendicular thereto through notch 38 in wing 32, is a shaft 52. Shaft 52 has a length approximately 1.5–2.0 times the diameter of the front stabilizer 24. Mounted on the opposite free end of shaft 52 is a rear stabilizer 54 having a plurality of fins 56 radially arranged at equiangular positions from each other.

A plurality of struts 58 interconnect the rear stabilizer 54 with the front stabilizer 24. The struts 58 are connected to the front stabilizer 24 at equiangular positions to provide maximum support to the rear stabilizer 54. In an alternate embodiment, the shaft 52 may be omitted, leaving the rear stabilizer 54 supported solely by struts 58.

FIG. 4 shows a towing bridle 60 and a recovery device such as a buoy 20 coupled to the ring paravane 14. Preferably, bridle 60 includes at least one high strength, corrosion resistant cable 62 having one end coupled to the distal end of towing cable 12 by a shackle 64. The other end of cable 62 may be coupled to the hole 30 located midway along span 28 by a second shackle 66. A second cable 68 may also have one end coupled by a shackle 70 to the distal end of towing cable 12 and the other end coupled by shackle 72 to a predetermined one of the plurality of holes 26 extending through the front stabilizer 24. The lengths of each cable 62 and 68 depend upon the desired towing configuration to be achieved. That is to say, for shallow towing, cable 68 may be three-quarters the length of cable 62, and for deep tows, cable 68 may be one-quarter the length of cable 62. The length differences are designed to keep the front stabilizer perpendicular to the direction of tow.

A second cable 22 having a recovery device such as buoy 20 coupled to one end, is connected by shackle 74 to the same portion of the front stabilizer 24 as the cable 68 of the bridle 60. Buoy 20 should be of appropriate size to be pulled under water by the paravane 14 while in tow, yet float the paravane 14 to the surface while dead in the water. The buoy 20 is primarily for retrieving the paravane should the paravane separate from the bridle or cable.

A tow fish, such as 16 shown in FIG. 1, may be coupled by a length of cable to hole 30 in the middle of span 28 in the same manner as cable 62. The length of the tow fish cable is such that when coupled to the paravane 14, the tow fish hangs well below the front stabilizer 24. It is preferred that the tow fish cable run along the front of the front stabilizer 24; however, it may extend therethrough as long as the tow fish is allowed to vertically pend therefrom without the tow fish cable binding with structural components of the paravane 14. In another embodiment, the tow fish 16 may be mounted directly under the shaft 52 or may be physically incorporated in place of the shaft 52.

The towing behaviour of the paravane depends heavily upon many characteristics, important of which are the towing speed, the pitch or angle of attack of the wing, the amount of bank or roll of the wing, and the length of the towing cable payed out. As is well known in hydrodynamics as well as aerodynamics, all of the above characteristics influence the performance characteristics of the paravane. For the sake of this discussion, several of the above characteristics will be assumed to be constant. For example, but not by way of limitation, assume the towing velocity will be substantially equal to 5 knots, the angle of attack might be substantially equal to −25 degrees, and the length of cable payed out might be substantially equal to 45 meters (m). It is well known to those skilled in the art than an increase in towing speed, such as greater than 6 knots, may well require a reduction in the wing angle of attack to prevent the wing from stalling. Conversely, the wing angle of attack may be increased with towing speeds less than 5 knots.

To orient the paravane 14 in the water 18 directly behind the towing point on the ship 10, cable 68 of the bridle 60 should be coupled to the top of front stabilizer 24. Cable 62 should be coupled to hole 30 in the center of span 28. The buoy cable 22 is preferably coupled to the front stabilizer 24 at substantially the same point as the bridle cable 68.

When initially deployed, the paravane 14 is properly oriented in the water by the buoy 20 such that the wing 32 is essentially horizontal. That occurs because the front stabilizer 24 seeks to achieve its lowest energy level and thus the center of gravity will cause the front stabilizer 24 to hang like a pendulum from the buoy cable 22. Since the buoy cable 22 is coupled to the top of the front stabilizer 24, the wing 32 will be essentially horizontal.

As mentioned earlier, bridle cable 68 is substantially shorter than bridle cable 62. With the paravane 14 under tow at shallow depths, bridle cable 68 initially increases the dive angle of the paravane 14 and lessens the dive angle at greater depths. Bridle cable 68 also tends to counteract drag forces present in the top of the front stabilizer 24 caused by buoy 20, thus the longitudinal axis of the paravane is essentially parallel to the direction of tow. The front and rear stabilizers 24 and 54 respectively also aid in maintaining the attitude of the paravane.

In contrast to towing the paravane 14 directly behind the tow point, maximum lateral displacement of the paravane is achieved by rotating the coupling point of the bridle cable 68 to the front stabilizer 24, by 45 degrees to a predetermined one of the many holes 26. That is to say, maximum deflection of the paravane 14 to the starboard side of the towing vehicle, for example, may be achieved by coupling the bridle cable 68 to the front stabilizer 24, 45 degrees to the left of the span 28. Thus, while under tow, the bridle 60 will roll the paravane, and thus the wing, to essentially a 90 degree bank relative to the horizontal, resulting in maximum lateral deflection to the starboard side. Coupling of the bridle cable 68 to the front stabilizer, 45 degrees to the right of the span 28, will result in maximum lateral deflection to the port side. The recovery buoy 20 has its cable 22 coupled to the front stabilizer 24 slightly to what would be the lower side of span 28 when the paravane 14 is towed for maximum deflection. The small amount of buoyancy provided by the recovery buoy 20 keeps the wing from breeching the surface.

It has been found that to tow the paravane 14 at an angle of 45 degrees from the tow point, the bridle cable 68 should be coupled to one of the holes 26 in the front stabilizer 24 at points approximately 22.5 degrees from the top junction of the span 28 with the front stabilizer 24. For towing configurations less than the maximum lateral deflection, the recovery buoy cable 22 may be coupled to the front stabilizer 24 at the same location as the bridle cable 68. This is because bridle cable 68 is dominant in maintaining the orientation of the paravane. The drag of the towing cable 12 aided by the front and rear stabilizers 24 and 54 provide the necessary forces to prevent the paravane 14 from spiraling.

For illustrative purposes, my invention has been described with a certain degree of specificity. Variations will occur to those skilled in the art but which may be included within the scope and spirit of this invention which is limited only by the appended claims.

I claim as my invention:

1. A paravane disposed at a distal end of a cable for positioning at least one tow fish in a body of water, comprising:
   (a) a ring stabilizer having a plurality of holes extending therethrough;
   (b) a wing including a leading edge and trailing edge portion having an adjustable angle of attack diametrically disposed within said ring stabilizer;
   (c) a shaft centrally connected to said ring stabilizer and axially extending therefrom;
   (d) a second stabilizer coupled to said shaft and spaced apart from said ring stabilizer;
   (e) a plurality of struts equiangular from each other and interconnecting said ring stabilizer and said second stabilizer; and
   (f) means for coupling said paravane to said distal end of said cable including means for adjusting an angle of bank of said wing.

2. A paravane as recited in claim 1, further comprising:
   (a) means for adjusting the angle of attack of said wing disposed within said ring stabilizer;
   (b) means coupled to said ring stabilizer for recovering said paravane; and
   (c) means for detachably coupling said at least one tow fish to said paravane.

3. A paravane as recited in claim 2 wherein said means for coupling said paravane to said distal end of said cable, comprises:
   (a) a bridle, further comprising:
      1. a first and a second bridle cable, each bridle cable having a first and a second end, and said first bridle cable longer than said second bridle cable;
      2. said first end of said first and second bridle cable coupled to said distal end of said cable;
      3. said second end of said first bridle cable centrally coupled to said ring stabilizer; and
      4. said second end of said second bridle cable coupled to a predetermined point along said ring stabilizer.

4. A paravane as recited in claim 3, wherein said means for adjusting the angle of attack of said wing disposed within said ring stabilizer, comprises:
   (a) two adjusting brackets diametrically opposing each other and mounted to said ring stabilizer, each of said adjusting brackets having a plurality of holes extending therethrough;
   (b) a rod extending through said wing parallel to and near said trailing edge portion and extending through a like hole in each of said adjusting brackets; and
   (c) a rod extending through said wing parallel to and near said leading edge portion and retained by two of said holes in said ring stabilizer.

5. A paravane disposed at an end of a cable for positioning a tow fish towed through a body of water by a vehicle, comprising:
   (a) a cylindrical stabilizer;
   (b) a wing having a predetermined angle of attack and bank diametrically disposed within said cylindrical stabilizer;
   (c) a second stabilizer spaced apart from said cylindrical stabilizer and concentric therewith;
   (d) a plurality of struts interconnecting said cylindrical stabilizer and said second stabilizer; and
   (e) means for coupling said cylindrical stabilizer to said end of said cable in a predetermined orientation.

6. A paravane disposed at an end of a cable for positioning a submersible towed behind a vehicle in a body of water, comprising in combination:
   (a) a cylindrical front stabilizer;
   (b) at least one wing having an adjustable angle of attack mounted within said front stabilizer;
   (c) a rear stabilizer spaced apart from said at least one wing;
   (d) a plurality of struts interconnecting said rear stabilizer with said front stabilizer; and
   (e) means for coupling said front stabilizer to the end of said cable in a predetermined orientation so as to position said paravane at a predetermined location behind said vehicle.

7. A paravane as recited in claim 6, further comprising:
   (a) means for adjusting an angle of bank of said wing;
   (b) means for adjusting the angle of attack of said wing;
   (c) means for coupling at least one tow fish to said paravane; and
   (d) means for recovering said paravane when said paravane is not under tow in the body of water.

8. A paravane as recited in claim 7 wherein said means for coupling said front stabilizer to the end of said cable, further comprises:
   a bridle including a first and a second bridle cable, each bridle cable having a first and a second end, said first end of said first and second bridle cable coupled to the end of said cable, said second end of said first cable axially coupled to said front stabilizer and said second end of said second bridle cable coupled to a predetermined point about said front stabilizer.

* * * * *